J. M. WASHBURN.
DISTANCE FINDER.
APPLICATION FILED AUG. 23, 1911.
1,033,848.
Patented July 30, 1912.
3 SHEETS—SHEET 2.
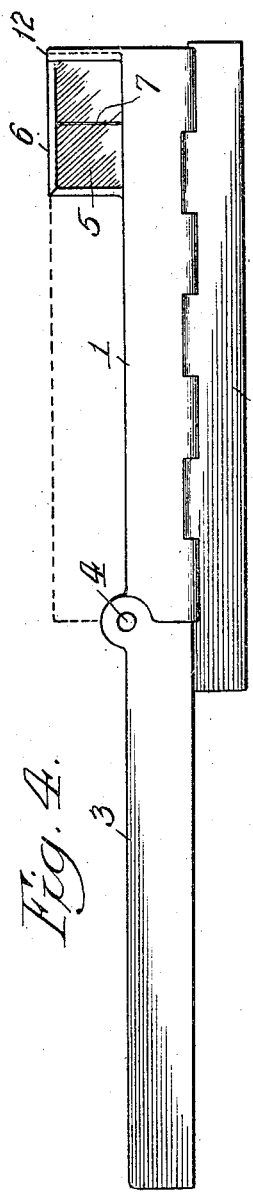
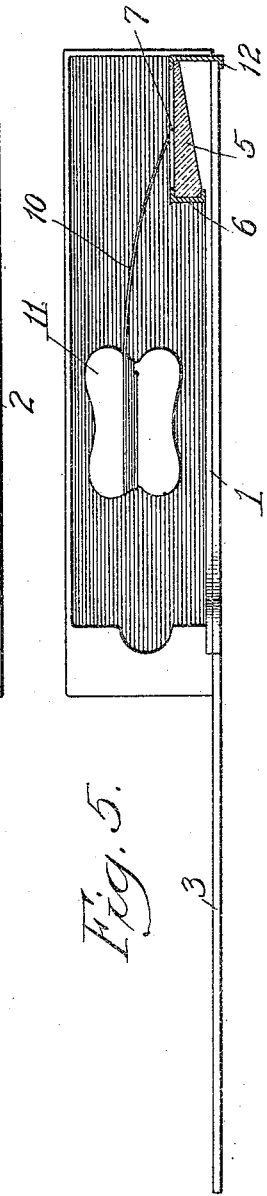
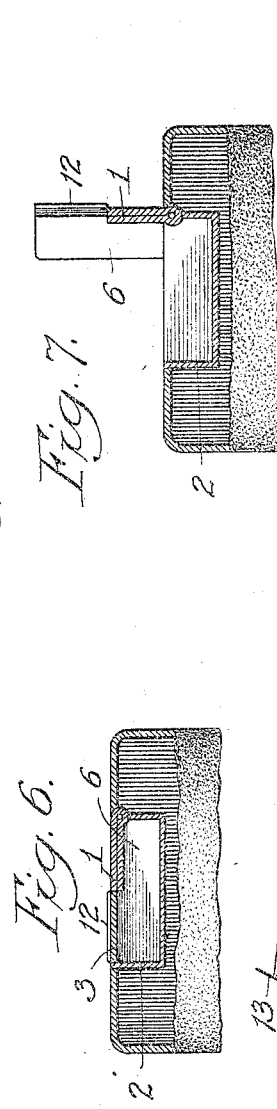
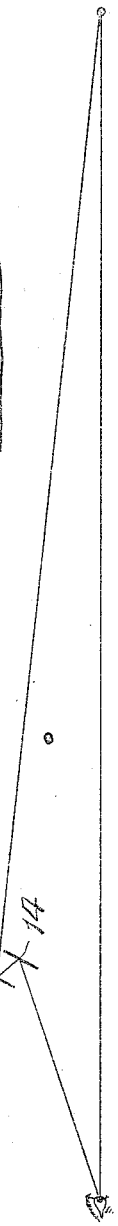
Witnesses:
John Enders
George Mankle
Inventor:
James Murray Washburn,
by Wallace R. Lane
Atty.

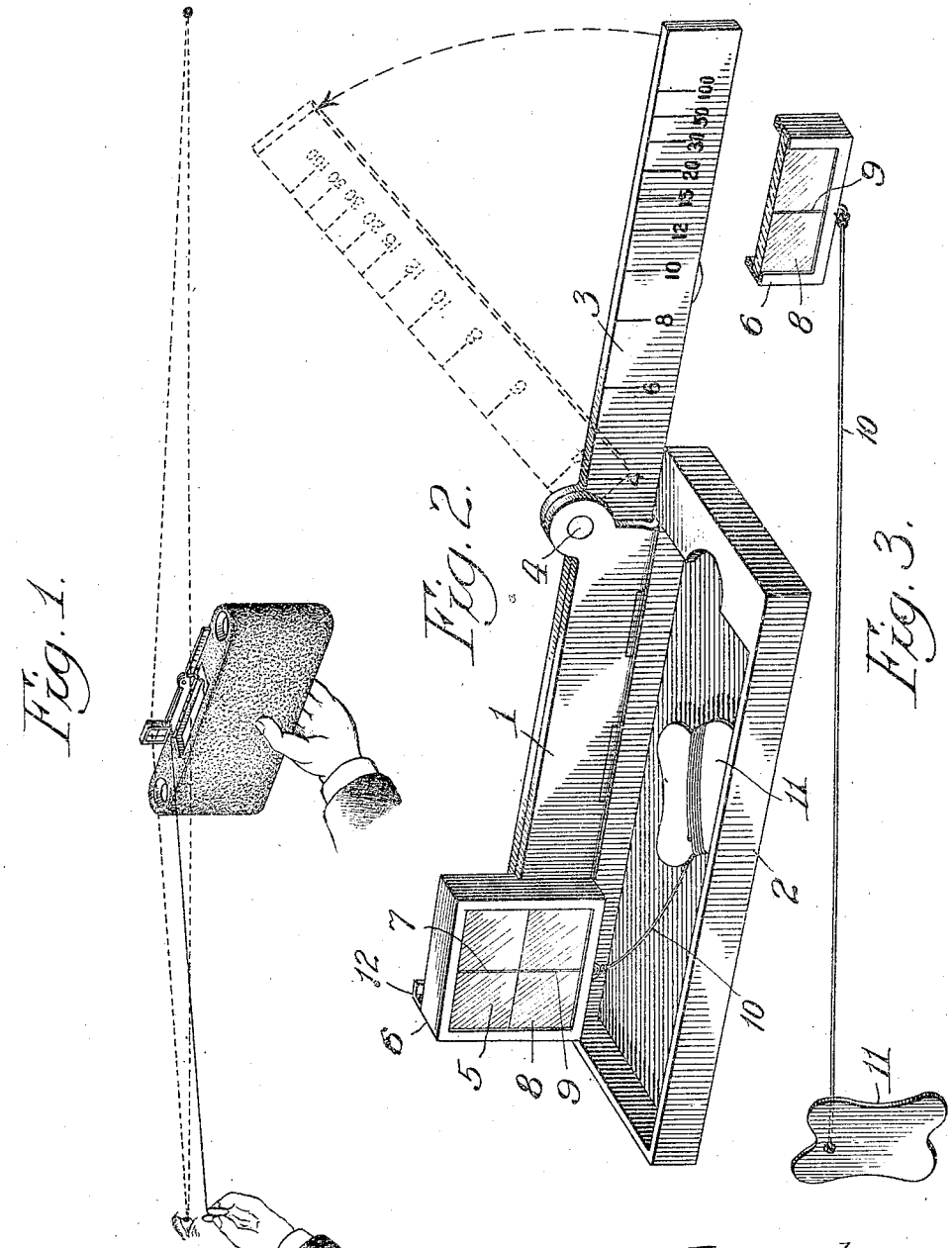

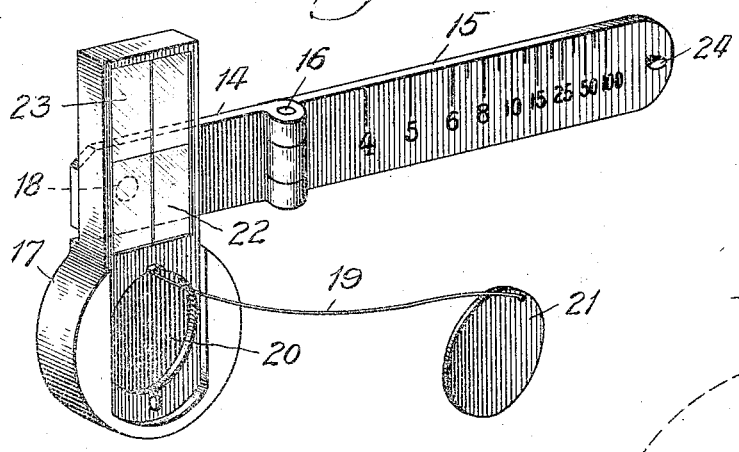
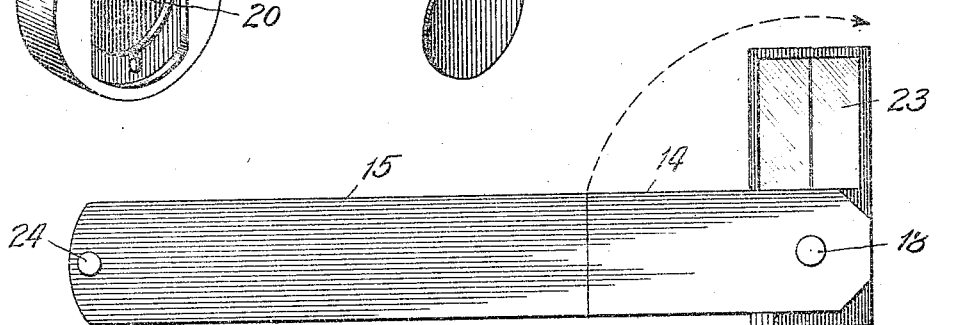
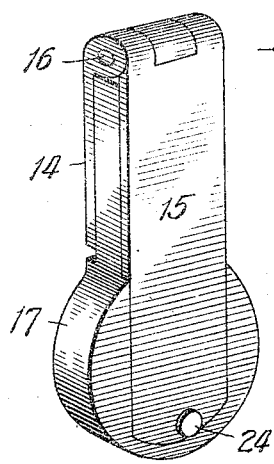
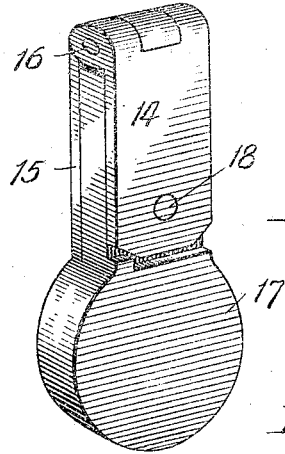

UNITED STATES PATENT OFFICE.

JAMES MURRAY WASHBURN, OF CHICAGO, ILLINOIS.

DISTANCE-FINDER.

1,033,848. Specification of Letters Patent. Patented July 30, 1912.

Application filed August 23, 1911. Serial No. 645,685.

*To all whom it may concern:*

Be it known that I, JAMES MURRAY WASHBURN, a citizen of the United States, residing at Chicago, in the county of Cook and State of Illinois, have invented a new and useful Improvement in Distance-Finders, of which the following is a specification.

It is the object of the present invention to provide means for determining the distance to an object without the necessity for mathematical calculations of any kind; to provide a distance finder which is compact and portable in structure and adapted for determining the distance of objects within the range of an ordinary camera.

According to one modification hereinafter disclosed, the distance finder is attached to a hand-camera and is adapted to fold down into that camera as an integral part thereof; while in another modification hereinafter disclosed, the distance finder is unconnected with a camera structure and may be used for purposes quite independent of the art of photography.

In general, the distance finder of the present invention comprises a bar carrying a light-deflecting device at one end and a scale of distance units at the other end. The device is also provided with means whereby this bar may be brought into position at a definite or fixed distance from the eye of the observer and whereby the bar may there be held at a definite angle with respect to the line of sight over the calibrated end of the bar.

In the modifications shown in the drawing, the means for locating the proper position of the bar with respect to the eye of the observer includes a flexible cord, one end of which can be held near the observer's eye, and the other end of which terminates in a mirror wherein the observer's eye is reflected when the bar is at its proper angular position with respect to the direct line of sight to the object.

In the accompanying drawings, Figure 1 is a perspective view of a distance finder attached to the top of a hand-camera; Fig. 2 is a perspective view of the finder illustrating in dotted lines the folding character of the sight bar; Fig. 3 is a detail of the flexible cord and its coöperating mirror; Fig. 4 is a rear view of the finder when unfolded for use; Fig. 5 is a top plan view of the finder with the reflecting prism shown in section; Fig. 6 is a section through the top of a camera box, showing the finder folded down when not in use; Fig 7 shows the finder erect above a camera box; Fig. 8 is a diagram illustrating the use of two mirrors as the means for deflecting light to the eye of the observer; Fig. 9 is a perspective view of a modification independent of a camera structure and adapted for support directly in the hand of the operator; Fig. 10 is a rear view of this modification; and Figs. 11 and 12 are perspective views, respectively, of the front and back structure shown in Fig. 9 when that structure is folded up and not in use.

In the construction shown in Figs. 1 to 7 inclusive, the distance finder comprises a sight bar 1 hinged to a receiving box 2 and provided with an extension 3, calibrated and marked off to indicate distances in feet or other suitable units. The extension 3 is connected to the main portion 1 of the sight bar by a rule joint 4 about which the extension may be folded over into position above the portion 1, so that the entire sight bar and its adjuncts can then be folded down into the receiving box 2, which preferably is countersunk into the top of the camera box, as shown in Fig. 1.

A light-deflecting device is mounted on one end of the sight bar and, in the structure illustrated by Fig. 2, comprises a glass prism 5 held in a metal box or framework 6. Across the face of this prism at its middle, is a vertical hair line or sight line 7. Below prism 5 and mounted in box 6, is a plane mirror 8 arranged parallel to the sight bar and provided at its middle with a vertical sight line 9. Immediately below the sight line 9, there is attached a flexible cord 10 carrying at its other end a suitable handle 11, preferably shaped to serve as a winding reel for the cord.

When in use, the camera and its supported distance finder are held in the hand of the operator at a distance from the eye of the operator equal to the length of flexible cord 10, and the camera is then twisted about a vertical axis until the eye of the observer appears reflected at the center of mirror 8, while at the same time the operator sees at the center of prism 5 the object to which the distance is to be measured. It is then only necessary for the operator to hold the camera stationary and shift the line of sight from the prism directly to the object over the calibrated extension 3 of the sight bar, whereon the distance of the object may be read off directly in feet, yards, or other units. When the distance finder is attached to a camera, the sight bar is preferably calibrated to read directly in feet, the distance from the camera lens to the object. Knowing the distance from the camera to the object, the observer adjusts the bellows of the camera to the proper position for a true focus on the object.

To close the finder for storage in the top of the camera, the cord 10 is wound on the reel or finger-piece 11 and placed in the receiving box or tray 2, the extension 3 is folded over against the hinged portion 1 and with its end securely held in an angular projection 12 at the back of box 6 and then the entire sight bar, including the prism and mirror, are folded down into the box or tray 2, as illustrated in Fig. 6.

Fig. 8 indicates diagrammatically a modification wherein the light-deflecting means, instead of being a prism, consists of two reflecting mirrors 13 and 14, set at such angles with respect to one another and to the eye of the operator that light coming from the distant object is deflected to the same degree as though it passed through the prism of Fig. 2. While various kinds of deflecting prisms may be used in the structure illustrated by Fig. 2, I have found that a thirty degree prism is admirably adapted for the purpose.

The modification illustrated in Figs. 9 to 11, inclusive, comprises a bar 14 having a hinged extension 15 carrying the calibrated scale, there being a rule joint 16 between these two portions of the sight bar. A housing 17 is connected to one end of the sight bar by a pivot 18, said housing having its lower portion shaped to form a cylindrical chamber wherein a spring roller or reel may be mounted to take up automatically the slack in the flexible cord 19. This housing may also have a circular recess 20 for the reception of a circular thumb-piece 21, attached to the cord. A mirror 22 and a prism 23 are mounted in a box above this housing and serve the same functions as those previously described. The entire structure can be operated much like that of Fig. 2, but need have no connection with a camera and can be calibrated to measure distances from the observer's eye instead of from a camera lens.

When the structure is to be folded up, the sight bar is swung about its pivotal mounting 18, as indicated by the arrow in Fig. 10, and is then folded over, as shown in Figs. 11 and 12, with its calibrated end fitting over the prism and mirror and holding the thumb-piece 21 in its socket 20. A spring catch 24 may be provided to hold the bar in its folded position.

It is obvious that the basic idea of my invention may be structurally embodied in other forms than that herein shown and described, and I do not, therefore, wish to be limited to the construction herein set forth, except as may be indicated by the claims made thereon.

What I claim as new and desire to secure by Letters Patent of the United States is:—

1. A distance finder comprising a bar having a scale of distance units at one end, a light-deflecting device at the other end of said bar, means for fixing the distance at which the finder is held from the eye of the observer, and means for indicating to the observer that the bar is held at such angle to the line of sight that the distance to an object may be read directly from the distance scale of the bar.

2. A distance finder comprising a bar having a scale of units at one end and a light-deflecting device at the other end, a cord of predetermined length leading from said bar to fix the distance at which the finder is held from the eye, and means for indicating to the observer when the bar is in proper angular position for the reading of distances on the bar.

3. A distance finder comprising a sight bar carrying a calibrated scale over which an observer may sight directly at an object, said bar carrying at a point remote from said scale a light-deflecting means through which the observer may see the object, and means for indicating to the observer the correct distance of said scale from the observer's eye and the correct angular position of said scale with respect to the line of sight.

4. A distance finder comprising in combination a sight bar, means for indicating to the observer the proper distance at which said bar is to be held from the eye of the observer and the proper angular position of said bar with respect to the line of sight from the observer's eye to an object, light-deflecting means associated with said bar for bringing to the eye of the observer deflected light from said object, and a scale associated with said sight bar for measuring along said bar the distance between the direct line of sight to the object and the path of said deflected light from the object.

5. A distance finder comprising a bar having a scale of distance units at one end to represent the distance of an object from the observer, a prism at the other end of the bar, a cord of predetermined length leading from said bar to fix the distance at which the instrument is held from the eye of the observer, and means for indicating to the observer that the bar is held at right angles to the taut cord when the instrument is in use.

6. A distance finder comprising a bar having a scale of distance units at one end to represent the distance of an object from the observer, a prism at the other end of the bar, a mirror attached to said bar, and a cord of predetermined length leading from said bar at a point in alinement with said mirror to fix the distance at which the instrument is to be held from the eye.

7. A distance finder comprising a bar having a frame at one end and a scale of distance units at the other end to represent the distance of an object from the observer, a prism and a mirror secured in said frame in vertical alinement with each other, and a cord of predetermined length leading from said bar at a point in vertical alinement with said mirror and prism to fix the distance at which the instrument is to be held from the eye.

8. A distance finder comprising in combination a prism, a scale of distance units to represent the distance of an object from the observer's eye, and means for indicating to the observer, when the instrument is in use, that the same is being held at right angles to a line of sight between the eye and the instrument.

9. A distance finder comprising in combination, a light deflecting device and a scale of distance units to represent the distance of an object from the observer's eye, and a mirror for indicating to the observer, when the instrument is in use, that the same is being held at right angles to a line of sight between the eye and the instrument.

10. A distance finder comprising in combination a sight bar, extensible means for indicating to the observer the proper distance at which said bar is to be held from the eye of the observer, means for insuring proper angular relation of the bar with respect to the line of sight from the observer's eye to an object, light deflecting means associated with said bar for bringing to the eye of the observer deflected light from said object, and a scale for measuring along said bar the distance between the direct line of sight to the object and the path of said deflected light from the object.

11. A distance finder comprising a bar having a scale of distance units to represent the distance of an object from the observer, a prism at one end of said bar, means for fixing the distance at which the instrument is to be held from the eye of the observer when a reading is to be made, and a mirror for indicating to the observer that the bar is held at right angles to a line of sight from the eye to the bar.

12. A distance finder comprising a bar having a scale of distance units at one end to represent the distance of an object from the observer, a prism at one end of said bar, extensible means of predetermined length secured to said bar to fix the distance at which the instrument is held from the eye of the observer, and means for insuring proper angular relation between said bar and a line of sight to the bar when the instrument is in use.

13. In combination, a receiving box, a distance finder attached to said box and adapted to fold therein, said finder comprising a bar hinged along one edge of said box so as to lie flat within the same or be folded upward, said bar being extensible, a prism at one end of said bar, a mirror attached to said bar, a scale of distance units on a section of said bar to represent the distance of an object from the observer, and means for fixing the distance at which the instrument is to be held from the eye of the observer when a reading is being made.

14. A distance finder comprising a bar consisting of two sections pivoted together so as to fold one over the other or be extended into alinement with each other, the first section being provided with a frame at its outer end, a prism and a mirror secured in said frame in vertical alinement with each other, a scale of distance units on the second section to represent the distance of an object from the observer, and extensible means of predetermined length leading from the finder to fix the distance at which the bar is to be held from the eye.

15. A distance finder including a prism, a bar having a scale of distance units to represent the distance of an object from the observer's eye, means for fixing the distance at which the instrument is to be held from the eye of the observer and for insuring proper angular relation of said bar to a line of sight from the observer's eye, and a receptacle hinged to said bar and into which said bar may be folded when not in use.

In witness whereof, I hereunto subscribe my name this 21st day of August, A. D. 1911.

JAMES MURRAY WASHBURN.

Witnesses:
CAROLYN WEBER,
ARBA B. MARVIN.